United States Patent [19]

Beach

[11] 4,396,102

[45] Aug. 2, 1983

[54] LOCKING CLUTCH ASSEMBLY IN A WINCH

[75] Inventor: Robert G. Beach, Tulsa, Okla.

[73] Assignee: Ramsey Winch Company, Tulsa, Okla.

[21] Appl. No.: 187,511

[22] Filed: Sep. 15, 1980

[51] Int. Cl.³ .................... F16D 11/04; G05G 5/06
[52] U.S. Cl. ................... 192/99 S; 74/529; 74/536; 192/114 R; 242/54 R; 242/85
[58] Field of Search ............ 192/114 R, 99 S, 67 R; 74/535, 529, 536; 242/85, 54 R

[56] References Cited

U.S. PATENT DOCUMENTS

| | | | |
|---|---|---|---|
| 803,495 | 10/1905 | Lund | 74/536 |
| 1,033,145 | 7/1912 | Azbill | 74/536 |
| 1,181,321 | 5/1916 | Lambert | 192/99 S X |
| 2,277,966 | 3/1942 | Franzkowiak | 74/536 |
| 2,377,575 | 6/1945 | Ringer | 192/48 |
| 2,611,464 | 9/1952 | Rabe | 192/93 |
| 3,266,607 | 8/1966 | Frisbie | 192/114 X |
| 3,398,611 | 8/1968 | Hahner | 192/114 X |
| 3,572,163 | 3/1971 | Clark | 74/625 |
| 3,709,052 | 1/1973 | Lassanske | 192/114 R X |
| 4,108,293 | 8/1978 | McHenry | 192/67 R |

FOREIGN PATENT DOCUMENTS

| | | | |
|---|---|---|---|
| 193063 | 2/1906 | Fed. Rep. of Germany | 74/536 |
| 855807 | 11/1952 | Fed. Rep. of Germany | 192/114 |
| 3860 | of 1906 | United Kingdom | 74/535 |
| 443212 | 5/1975 | U.S.S.R. | 192/114 R |

Primary Examiner—Rodney H. Bonck
Attorney, Agent, or Firm—Ralph E. Zimmerman

[57] ABSTRACT

A manually operated clutch assembly for engaging and disengaging a rotatable cable drum in a winch assembly to a source of power which comprises a shifting lever with a two-directional rotatable hand grip which actuate a pair of push rods mounted on the said shifting lever, the said push rods controlling a latching pin in assembly with a clutch shifter with a yoke attached to the clutch shifter. The said yoke actuates a rotatable jaw clutch into a position to engage a rotatable cable drum. The said shifting lever simultaneously moves a locking rod into position to lock the axial movement of the jaw clutch.

1 Claim, 3 Drawing Figures

LOCKING CLUTCH ASSEMBLY IN A WINCH

BACKGROUND OF THE INVENTION

This invention relates to an apparatus suitable to connect and disconnect power to a winch cable drum by means of a shifting lever in assembly, the source of power being electric, hydraulic or mechanical means.

DESCRIPTION OF THE PRIOR ART

The U.S. Pat. No. 3,572,163 to Clark, issued Mar. 23,1971 relates means to operate a valve by a motor by connecting and disconnecting an output shaft, 24, FIG. 1, by movement of spheres 26, FIGS. 1 and 2, in a transverse bore by turning knurled knob 35, FIG. 1, in a clockwise direction to engage shaft 24 with gear 23 to transmit power to gear train 21, FIG. 3. Applicant's apparatus too, involves a locking device as part of the apparatus. However, this is only part of the functioning mechanism of this apparatus and only works in conjunction with other features of this invention which shall become apparent in the disclosure herein.

The patent to Rabe, U.S. Pat. No. 2,611,464 issued Sept. 23, 1952, shows a cam operating coupling with spheres engaging the movable clutch element. The Rabe patent shows movable clutch elements involving free balls positioned in a groove 25, FIG. 3; movement of 30 inwardly cause the balls to move along surface 20 into groove 36. This movement pushes member 15 inwardly decreasing the size of V-slot thus tightening the V-belt to give rotating movement to member 10, FIG. 3, on shaft 2, FIG. 3. Movement of actuator 30 in the opposite direction causes the operators to go in the opposite direction disengaging member 10 and loosening the V-belt. The operation of the spheres in this patent serve the same purpose as the Clark patent but the functional features of the entire structure are different from the Clark patent. Applicant uses this feature only as a means to lock the rotatable clutch into engagement of the clutch and the cable drum.

The U.S. Pat. No. 2,377,575 to Ringer, issued Sept. 23, 1952 shows the use of balls 58 and 59 on a rotating shaft 46, FIG. 1, to transmit power to drive shaft 24 from the gear carrying the projection engaging the balls 58 and 59. This is another application of the use of balls to engage a source of power to a drive shaft. Again, the use of steel balls shown in applicant's invention is confined to a locking device. The purpose of this use in the cited patent is mainly as a speed change mechanism in an assembly, not as a locking device in a clutch mechanism.

SUMMARY OF THE INVENTION

The present invention provides a hand operated clutch assembly with means to engage a rotatable power shaft with a cable drum. The invention includes an assembly including a shifting lever with a latching pin movement of which is controlled by a pair of push rods assembled in the shifting lever which are operated by a remote hand grip mounted on the shifting lever. A spring loaded shifting rod with a yoke attached is pivotally mounted on the shifting lever and moves a rotatable jaw clutch powered by a rotating shaft. A spring loaded locking rod in assembly with steel balls locks the jaw clutch into engaged position.

BRIEF DESCRIPTION OF THE DRAWINGS

The details and objects of this invention from the detailed description taken with the drawings illustrate the embodiments of my invention.

DESCRIPTION OF THE PREFERRED EMBODIMENTS

Figure 1:
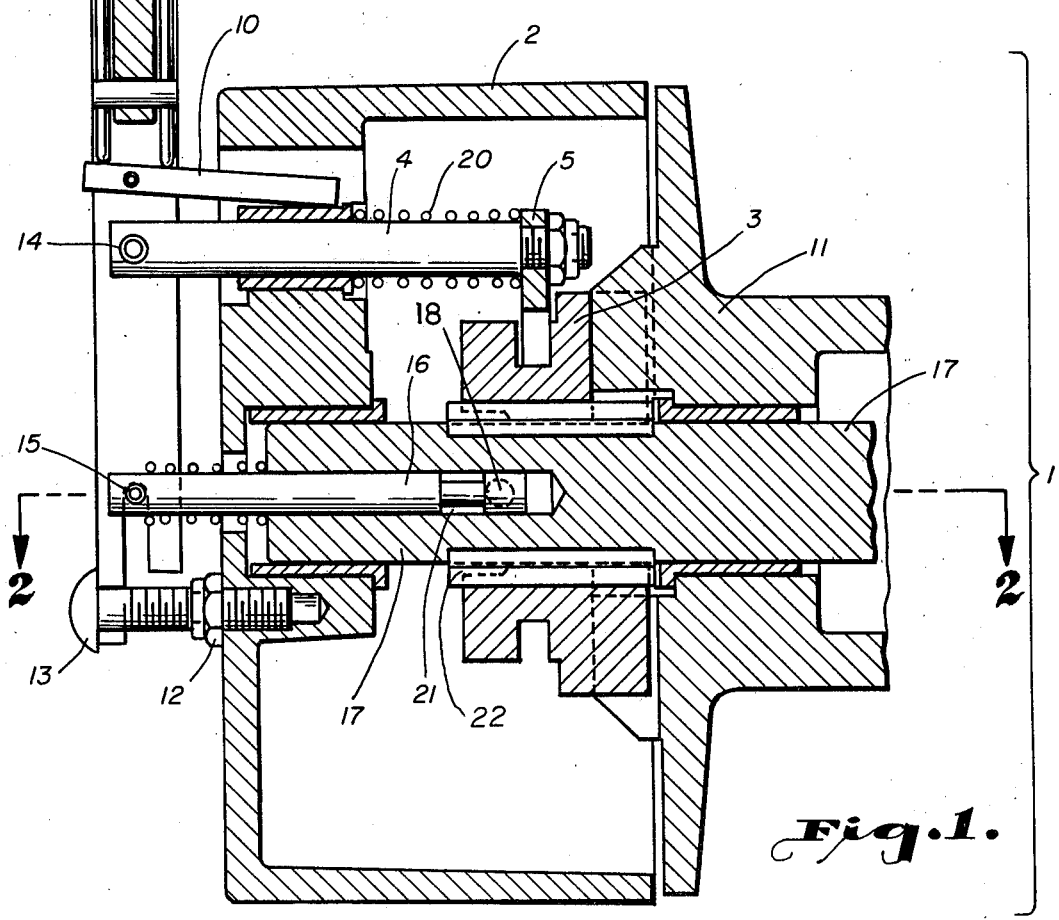
FIG. 1 is a partial sectional drawing of the clutch to show the essential components for the operation of the winch clutch.

The functions and description of the locking clutch assembly are shown in 1, FIG. 1. The unit comprises the locking clutch housing 2 in which the following components are contained therein: a jaw clutch 3 which is actuated by a spring loaded shifting rod 4 with a yoke 5 attached thereto; yoke 5 moves in a slot located in rotatable jaw clutch 3. The shifting rod 4 is assembled with a spring 20 to hold the yoke 5 on the shifting rod 4 in an extended position when the jaw clutch 3 is engaged with the rotatable cable drum. The shifting rod 4 is actuated by the movement of a lever 6 to which is attached a pair of pushrods 8 and 9 which actuates a latching pin 10 to latch and release shifting rod 4. The latching pin is actuated by movement of the hand grip 7 in a counterclockwise direction to release shifting rod 4 and engage jaw clutch 3 with the rotatable cable drum 11 and in clockwise direction to drop latching pin 10 in a position to hold rotating jaw clutch 3 disengaged from the rotatable cable drum 11. Shifting lever 6 is mounted by means of a slip joint in an adjustable bolt 13 to the clutch housing 2 at position 12. The shifting lever is attached to shifting rod 4 at position 14 and to the locking rod 16 at position 15. Power is supplied to the clutch assembly 1 by rotatable shaft 17 attached to a source of power (not shown).

Figure 2:
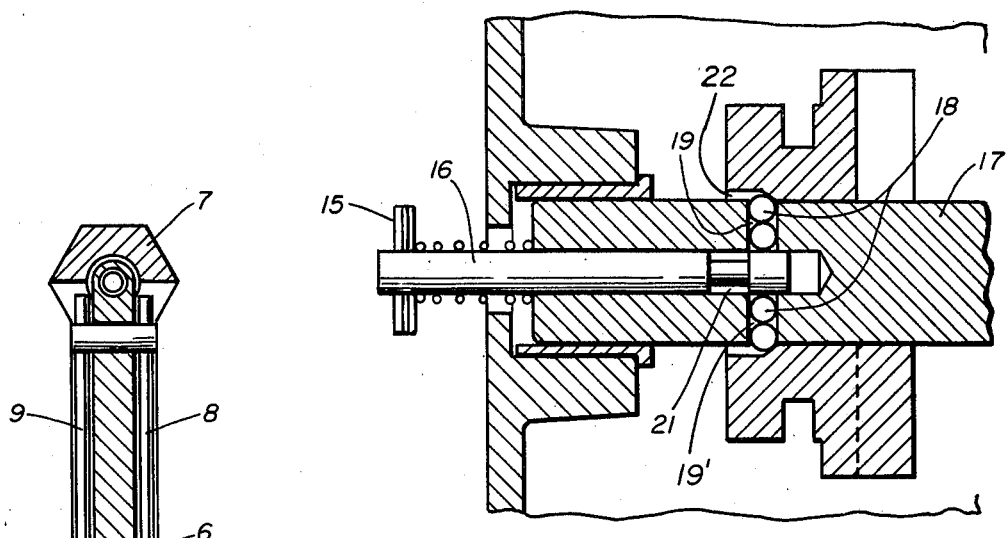
FIG. 2 is a partial sectional drawing of the locking device in an engaged position.

The spring loaded locking rod 16 shown in FIG. 2 is slideably mounted in a bore centered in rotatable shaft 17 and is shown in an engaged position. In this position all balls 18 a pair of balls being positioned respectively in each hole, 19 and 19' (see drawing FIG. 2). As shown in FIG. 2 are aligned in a pair of holes 19 and 19' in the rotatable shaft 17. In this position the jaw clutch 3 is in a locked position with the cable drum 11 being held in place by spring 20 and locked in place by the locking rod 16. The locking rod 16 is an added safety feature in operation of the winch and prevents the jaw clutch 3, FIG. 1, from releasing without releasing the shifting lever 6, FIG. 1.

Figure 3:
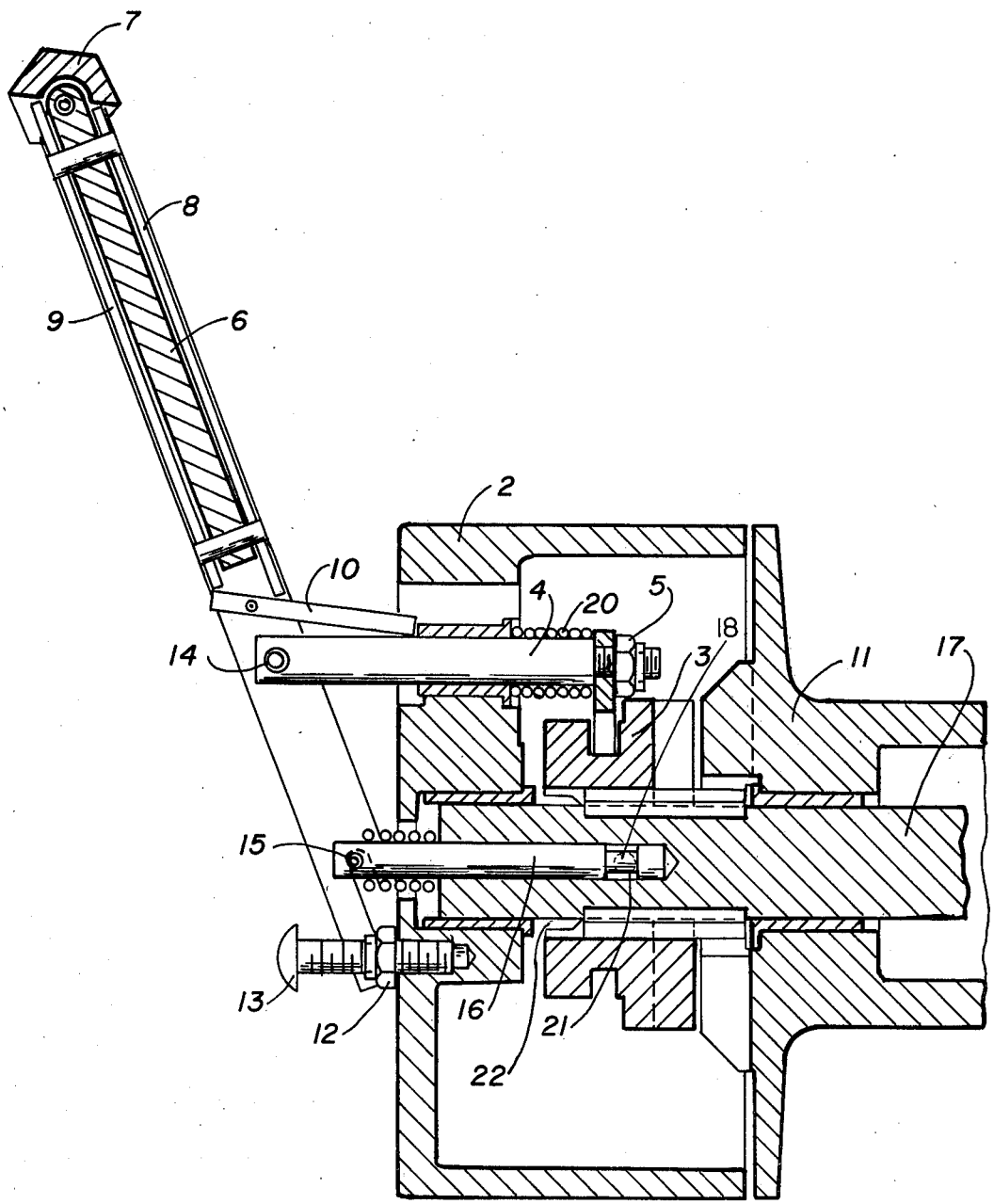
FIG. 3 is a cross-sectional drawing of the clutch assembly in an disengaged position.

Reference is made to FIG. 3 which shows the clutch assembly 1 in a disengaged position. In this position shifting lever 6 is in an outward position; hand grip 7 is shown mounted on shifting lever 6. Push rods 8 and 9 are attached to handle grip 7 and are positioned as shown in FIG. 3. Latching pin 10 is shown holding spring loaded shifting rod 4 which is attached at 14 to shifting lever 6 in a locked position to prevent the clutch jaw 3 from engaging with the cable drum 11 without movement of the shifting lever 6. Spring 20 is in a compressed position. Yoke 5 attached to the end of shifting rod 4 is useful to move rotatable jaw clutch 3 from an engaged position with cable drum 11 as shown in FIG. 1 to a disengaged position as shown in FIG. 3. Spring loaded locking rod 16 which is attached to shifting lever 6 at position 15 is shown in an outward position with two balls 18 in groove 21.

Shifting lever 6 is shown mounted to clutch housing 2 at 12 by adjustable bolt 13. Rotatable shaft 17 is fixably attached to jaw clutch 3. Jaw clutch 3 rotates with the rotatable shaft 17 when power (not shown) is furnished to the rotatable shaft 17 by either electrical, hydraulic or mechanical means.

OPERATING OF THE CLUTCH IN A WINCH ASSEMBLY

Reference is made to FIG. 1. To engage the clutch 3 with the cable drum 11, the handle 7 is turned in a counterclockwise direction causing the push rod 9 to move in a downwardly direction releasing the latching pin 10; spring 20 causes the shifting rod 4 attached to the yoke 5 to move forward. Yoke 5 moves rotatable jaw clutch 3 to engage the jaws on cable drum 11. Jaw clutch 3 is keyed to rotatable shaft 17 which is rotated by external power (not shown). As an added precaution the spring loaded locking rod 16 attached to shifter lever 6 moves outwardly and the steel balls 18, FIG. 2 move from the slot 21 into holes 19 and 19', FIG. 2, toward counterbore 22 locking jaw clutch 3 is in an engaged position for safe operation. With this locking device the rotatable jaw clutch 3 will not release from the jaws of the cable drum 11 until the handle 7 is moved outwardly pushing locking rod 16, FIG. 2, inwardly causing the steel balls 18 to fall into slot 21. This disengages jaw clutch 3 from engagement with the jaws in cable drum 11. Further motion of handle 7, FIG. 1 will move shifting rod 4 outwardly along with yoke 5 and jaw clutch 3. When the extreme outward position is reached, handle 7, FIG. 1 is turned clockwise causing push rod 8 to push latching pin 10 downwardly into its latching position, latching the entire clutch mechanism out of engagement.

Although I have described only a typical preferred form and application of my invention, the invention should not be limited or restricted to specific details herein set forth, but I wish to reserve to myself any variations that may fall into the scope of the following claims:

I claim:
1. A clutch assembly adopted for use in a winch, comprising:
    (1) a manually operated shifting lever attached to a clutch housing adopted to operate the said clutch assembly,
    (a) the said shifting lever having a pair of push rods attached to a hand grip, the said hand grip being movably mounted on the end of the said shifting lever, the said hand grip moving in a semi-circular direction, the said push rod moving in a vertical direction operating a latch pin pivotally mounted on the said shifting lever, the said latch pin being useful for latching clutch assembly in a clutch release position,
    (b) the said shifting lever operating a spring loaded shifting rod pivotally attached thereto:
        (1) the said spring loaded shifting rod having a yoke attached to the end of the said spring loaded shifting rod, the said yoke resting in a circular groove in a
    (2) jaw clutch
        (a) the said jaw clutch being keyed to a rotatable power shaft
            (1) the said rotatable power shaft having two drilled holes therein positioned opposite each other, each of the said drilled holes housing at least two steel balls,
        (b) the said jaw clutch having axial movement along the said rotatable power shaft, the said jaw clutch being actuated in a forward direction by the forward movement of the said yoke attached to the said shifting rod, the said jaw clutch engaging a rotatable cable drum,
            (1) the said jaw clutch being locking into position with the said rotatable cable drum by the movement of at least two steel balls into the said drilled holes in the said rotatable power shaft from a circular groove in a
    (3) spring loaded locking rod,
        (a) the said spring loaded locking rod being pivotally mounted on the said shifting lever,
        (b) the said spring loaded locking rod centered and movably mounted in a circular bore in the said rotatable power shaft,
        (c) the said circular groove in the said spring loaded locking rod aligning with the said drilled holes in the said rotatable power shaft when the said jaw clutch is moved backward to a clutch release position
        (d) the said circular groove in the said spring loaded locking rod receiving at least one of the said steel balls from each of the said drilled holes in the said power shaft placing the said jaw clutch in a released position.

* * * * *